US010666996B1

(12) United States Patent
Nair

(10) Patent No.: US 10,666,996 B1
(45) Date of Patent: May 26, 2020

(54) DETECTING SUB-NODE PLANT SERVICE CONDITIONS USING SUBSCRIBER

(71) Applicant: ARRIS Enterprises LLC, Suwanee, GA (US)

(72) Inventor: Harindranath P. Nair, Hillsboro, OR (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 13/728,550

(22) Filed: Dec. 27, 2012

(51) Int. Cl.
*H04N 21/24* (2011.01)
(52) U.S. Cl.
CPC .............................. *H04N 21/2404* (2013.01)
(58) Field of Classification Search
CPC .. H04N 17/004; H04N 17/00; H04N 21/6168; H04N 21/6118; H04N 21/6582; H04N 21/2401; H04N 21/2402; H04N 21/24; H04N 21/2404; H04N 21/2405; H04N 21/226; H04N 21/426; H04N 21/61; H04N 21/21; H04N 21/41

USPC ........................................................ 725/107
See application file for complete search history.

(56) References Cited

U.S. PATENT DOCUMENTS

| 6,909,741 B1* | 6/2005 | Smith .................... H04L 1/242 370/242 |
| 7,308,370 B2* | 12/2007 | Mason et al. .................. 702/65 |
| 7,810,127 B2* | 10/2010 | Stanek et al. ................ 725/129 |
| 2005/0183130 A1* | 8/2005 | Sadja et al. ................... 725/107 |
| 2007/0250880 A1* | 10/2007 | Hainline ............ H04N 7/17318 725/97 |
| 2010/0094548 A1* | 4/2010 | Tadman .................. G06F 3/048 |
| 2011/0119517 A1* | 5/2011 | Beeco ...................... G06F 1/28 |
| 2013/0257623 A1* | 10/2013 | Bagasra ...................... 340/657 |

* cited by examiner

*Primary Examiner* — Anthony Bantamoi
(74) *Attorney, Agent, or Firm* — Stewart M. Wiener

(57) ABSTRACT

Utilizing subscriber address information to provide an alert of a service condition that provides guidance on which area of a service network might be the source of the service condition.

10 Claims, 4 Drawing Sheets

US 10,666,996 B1

DETECTING SUB-NODE PLANT SERVICE CONDITIONS USING SUBSCRIBER

TECHNICAL FIELD

This disclosure relates to the use of subscriber address information to determine which devices within a network might require service.

BACKGROUND

Various utilities and companies provide network services to customers. These services include, for example, power, gas, water, electricity, television, and communications. Each of these networks has a different services delivery infrastructure. Delivery of service can originate from one or more central locations, and span to a user's home through a network that includes various connection points, devices, and mediums. One example of a services delivery network is that which is provided by cable television network operators (also referred to as multiple service operators or MSOs) to facilitate transport of video, data, and voice over infrastructure that has been referred to as community antenna television (CATV) networks. Subscribers can access these services through user devices, which can include, for example, cable modems, embedded multimedia terminal adapters (EMTAs) (also known as cable telephony modems), set-top boxes, televisions, or gateway devices.

Conditions such as, for example, low performance, errors, faults, failures, and disruptions can impact a user's ability to obtain or maintain these services. For purposes of this description, such conditions can be referred to as service conditions. Service conditions can occur at various points in the network, or with any equipment, along the path from the origination point of the service all the way to the equipment at a user's premises. For example, the unavailability of a user device at the user's premises might be due to a failure of a particular device, or the unavailability can be indicative of the failure of a network component further upstream that impacts many downstream user premises devices.

Information about the type of service condition, and the location where such service conditions occur can be very useful to a service technician. Determining the proximity of the impacted devices with each other, such as whether the devices share the same street of a street address, can inform as to where a service condition in the network has occurred. Such diagnosis can lead to faster and more efficient restoration of service or elimination of error and inefficiencies associated with the devices.

BRIEF DESCRIPTION OF THE DRAWINGS

Like reference numbers and designations in the various drawings indicate like elements.

DETAILED DESCRIPTION

In some implementations of this disclosure, systems and methods can operate to utilize subscriber address information when developing an alert of a service condition so as to provide guidance on which area of a service network might be the source of the service condition.

Figure 1:
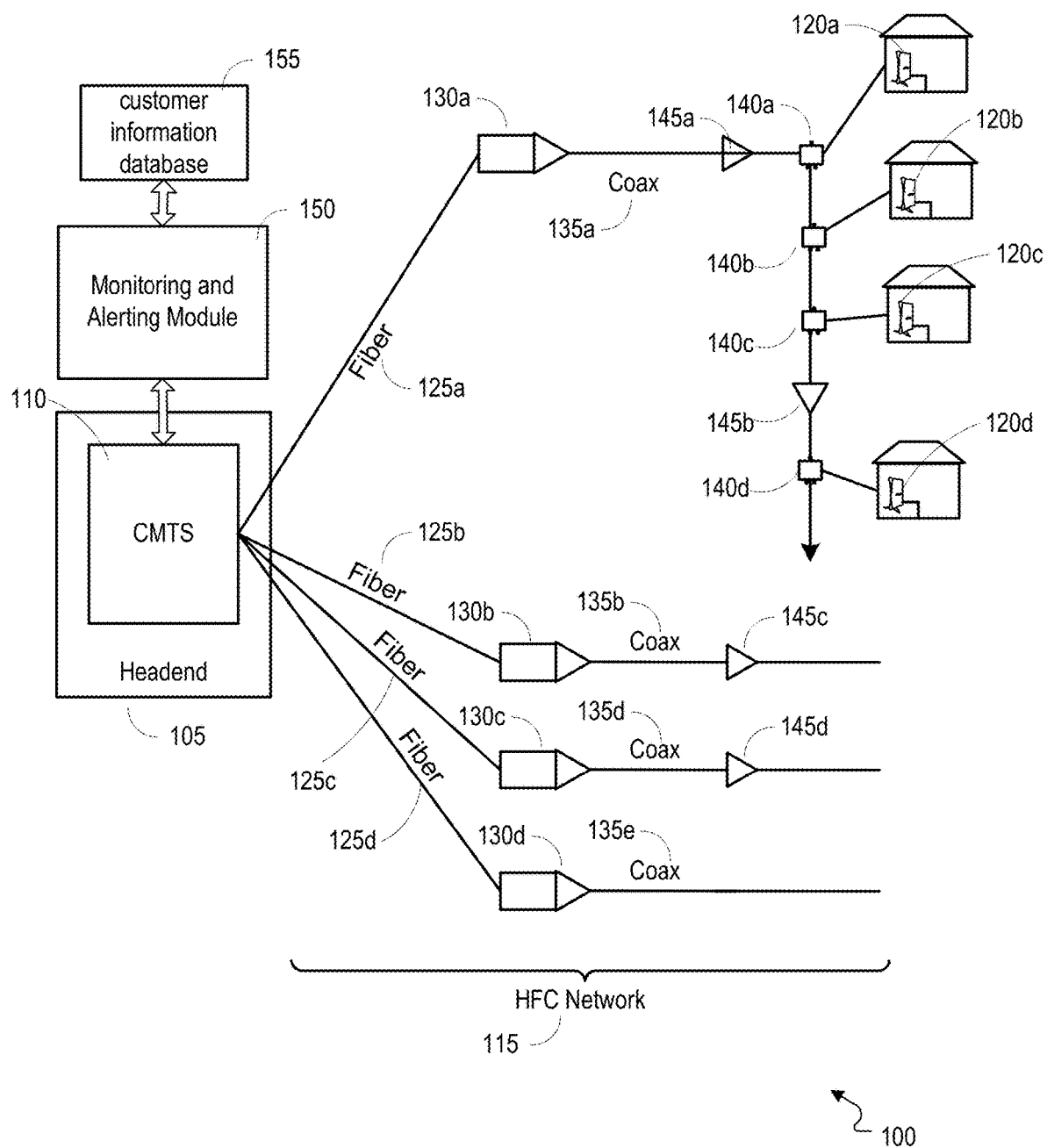
FIG. 1 is a block diagram illustrating an example network environment showing an HFC network coupled to a headend and multiple user devices.

FIG. 1 is a block diagram illustrating an example network environment for utilizing subscriber address information to provide an alert of a service condition. The network 100, which can be part of a CATV network, can include an edge serving office, for example an MSO's regional headend 105. The headend 105 can include a modulation/demodulation device, such as a cable modem termination system (CMTS) 110. The network of FIG. 1 can also include one or more transport networks connecting the headend 105 to one or more user devices 120a-d located at a customer's home or office premises. The transport network can include, for example, a Hybrid Fiber-Coaxial (HFC) network. The Hybrid-Fiber-Coax (HFC) cable plant used to deliver services to cable subscribers typically comprises both active and passive components. A typical HFC network, for example HFC network 115, can include a combination of optical fibers and coaxial cables through which signals can travel between the headend 105 and user devices 120a-d.

The HFC network 115 can include a bi-directional network, wherein signals are carried in both directions on the same network from the headend 105 to the user devices 120a-d, and from the user devices 120a-d to the headend 105. The downstream signals, which can also be referred to as forward-path signals, carry information from the headend 105 to the home such as video content, voice, and internet data. The upstream signals, which may also be referred to as return-path signals, carry information from user devices to the headend 105, such as control signals to order a movie, or internet data such as email.

Operationally, the headend 105 can receive video signals from a master headend, which typically has satellite dishes for receiving transmitted video signals and IP aggregation routers for data traffic. The headend can use integrated receivers and decoders, for example, to decode the video signals from video signal sources such as the satellite transmissions. The headend 105 can add local and public programming to the video offerings (as well as any local or targeted advertising) to the video signals. The video signals are then mixed in accordance with the cable system's channel numbering scheme using a series of cable modulators, which is in turn fed into a frequency multiplexer or signal combiner and inserted into a broadband optical transmitter. For IP-based transmissions, at a cable modem termination system (e.g., CMTS 110) at the headend 105, the various services—video, broadband data, and voice over IP data—can be encoded, modulated and upconverted onto radio frequency (RF) carriers, combined onto an electrical signal, and inserted into a broadband optical transmitter. The broadband optical transmitter can be operable to convert the electrical signal to a downstream optically modulated signal that is sent to one or more fiber optic nodes 130a-d.

Fiber optic cables 125a-d can connect the headend 105 to the fiber optic nodes 130a-d in a point-to-point or star topology, or in some implementations, a ring topology. A fiber optic node 130a-d typically serves between 25 and 2,000 homes.

Each fiber optic node 130a-d has a broadband optical receiver that can convert the downstream optically modulated signal received from the headend 105 into an electrical signal, which can include a radio frequency (RF) modulated signal. Each fiber optic node 130a-d also contains a reverse/return path transmitter that sends communication from user devices 120a-d back to the headend 105. On the downstream, the electrical signal output by the fiber optic nodes 130*a-d* travel through the co-axial portion of an HFC network 115, propagating through co-axial cables 135*a-d* that run along streets, either underground or strung on poles, to a plurality of user premises having end user devices 120*a-d*.

The co-axial cables 135*a-d* connected to the optical node can form a coaxial backbone to which smaller distribution co-axial cables can connect. These co-axial cables can be referred to as trunk coaxial cables. The smaller distribution co-axial cables carry the RF modulated electrical signal down individual streets. The distribution co-axial cables have taps, which serve as a connection point for co-axial cable drops to user premises. At one end, an F connector (not shown) can serve as a connector between the tap and the co-axial drops, while at the user premises end, the co-axial cable drop can be connected to the user premises at a ground block (not shown), which also serves to protect the system from stray voltages. From the ground block, the signal can be passed through one or more splitters throughout a user's premises to user devices 120*a-d*.

At various points, amplifiers 145*a-d* can be placed to boost signal strength to overcome cable attenuation and passive losses of the electrical signals caused by tapping or splitting the coaxial cable. For example, trunk cables can carry AC power, typically added to the cable line by a power supply and power inserter. The power added to the cable line can be used by trunk and distribution amplifiers so that the amplifiers need not use an individual, external power source. As another example, if too many splitters are used to connect user devices 120*a-d* on users' premises, the signal levels past those splitters can degrade. To prevent this degradation, drop or house amplifiers and line extenders can be used.

The transport network connecting the headend 105 to user devices can also include one or more radio frequency over glass (RFoG) networks (not shown), which can be deployed concurrently with an existing HFC network 115. An RFoG topology includes an all-fiber service from the headend 105 to a field node, or optical network unit (ONU), which is typically located at or near the user's premises. Coaxial cable can be used to connect the ONUs of an RFoG network to one or more user devices 120*a-d*. In the headend, a downstream laser sends a broadcast signal that is optically split a multitude of times. The optical network unit, or ONU, recovers the RF broadcast signal and passes it into the end user's coaxial network.

Upstream transmissions from the user devices 120*a-d* can pass through an RFoG network and be received by an RFoG transmitter/receiver at the headend. The user devices 120*a-d* can transmit RF signals to their respective ONUs. The ONUs can modulate the upstream RF traffic onto optical channels and sends those signals to an optical splitter, which then passes on the signals on the optical channels to the RFoG transmitter/receiver. In various implementations, the RFoG transmitter/receiver can include one or more separate transmitter and receiver components residing on the same board, or alternatively separate boards; further, the transmitter and receiver can also include various sub-components, such as modulators and demodulators. The RFoG transmitter/receiver receives the optically modulated signals on optical channels and demodulates the signals into the electrical signals, which can include RF signals. Signals from the RFoG network can then be combined with one or more RF signals coming from other HFC networks such as HFC network 115, or from other RFoG networks using an RF combiner, before being received by the CMTS transmitter/receiver.

The forward-path and the return-path (i.e., upstream and downstream signals) can be carried over the same HFC network 115. To prevent interference of signals, the frequency band may be divided into two or more sections in which at least one frequency band carries forward-path signals, and at least another that carries return-path signals. For the at least one return path, one of the user devices 120*a-d* transmits on a given frequency at any given time. However, it should be noted that multiple user devices 120*a-d* can transmit at different frequencies simultaneously. Typically, requests for upstream bandwidth are made by the user devices 120*a-d*. The CMTS 110 might grant or deny such requests based upon various characteristics such as, for example, network usage, previous requests for grants, etc. In some implementations, the CMTS 110 can generate one or more transmission maps that allocate user devices 120*a-d* a specific time slot and frequency at which the user devices 120*a-d* may transmit. The transmission maps can be generated using, for example, an enhanced concatenation and fragmentation algorithm such as specified in the DOCSIS standards, or any other suitable algorithm.

It should be understood that although FIG. 1 shows for illustrative purposes only four user devices 120*a-d*, four fiber cables 125*a-d*, four fiber nodes 130*a-d*, four co-axial cables 135*a-d*, four amplifiers 140*a-d*, and four amplifiers 145*a-d*, more of such devices can be deployed.

Often the only outside HFC plant topology information available for each user device 120*a-d* is for the fiber node 130*a-d* that feeds it. In prior art implementations, a CMTS 110 can be polled to identify all or most of the user devices such as 120*a-d* that are experiencing a service condition. Although in prior art implementations the fiber-node 130*a-d* cannot be interrogated for status, operators typically have good topology information about which fiber-node 130*a-d* serves which user devices. This information can be used to identify a fiber-node 130*a-d* might be the cause of a failure of all or most of the user-devices 120*a-d* known to be serviced by the node 130*a-d*.

User devices 120*a-d* can also be polled for its status. In some prior art implementations, both the CMTS 110 and the user devices 120*a-d* can also be operable to send a periodic message, typically referred to as a heartbeat, alerting the CMTS 110 of its presence. If the heartbeat is not received within a certain amount of time, the user device 120*a-d* can be deemed to be in an off-line condition, which might be indicative of a failure in these devices. However, an off-line condition for a user device 120*a-d* might be due to be the user device 120*a-d* being unplugged, as opposed to failed.

Unlike the situation with the CMTS 110, fiber-node 130*a-d* and user devices 120*a-d*, in prior art implementations, the sub-node part of the HFC network 115 (the part of the HFC network 115 that extends downstream from the fiber node 130*a-d* to the users' premises), detailed information is not available regarding which equipment used to provide service to each user device 120*a-d*. The sub-node topology is not available, and the sub-node active and passive devices, such as co-axial cables 135*a-b*, 135*d-e* (including trunk, distribution, and drop cables), taps 140*a-d*, F connectors, amplifiers 145*a-d*, and ground blocks, cannot be interrogated for their status, and do not send heartbeat signals upstream either.

Each of these HFC 115 sub-node devices can be a potential failure point. In the cable environment, a significant fraction of plant outages can be caused by the failures of sub-node devices. Detecting such service conditions as a plant service condition can allow for repair efforts to be focused on the HFC plant, rather than at the homes of individual subscribers.

Typically, in the absence of a detailed plant topology for each user device 120a-d, one approach to identifying service conditions such as an outage or failure involves utilizing a mapping tool to show on a map the area with the failed devices visually highlighted. The service technician can then determine the cause for failures from the geographic proximity of failed user devices. According to one current technique applied by a fault management system, cable plant information from plant design software can be used to overlay the HFC cable plant itself on such a map, to help identify the likely cause for the service condition. However, in this technique, the fault management system is unable to identify the whether a small number of outages is due to a plant service condition, or simply a collection of disparate service conditions on the part of each user device. Identifying whether a service condition is related to the HFC plant, or whether it related to equipment at a user premise can inform as to whether user premise repair technicians should be dispatched to the user premises, or plant repair technicians to the HFC plant.

As such, example implementations as illustrated in FIG. 1 includes one or more software programs or modules 150 that can infer a service condition for the HFC plant instead of relying on a human to visually interpret the clustering of failures to identify a potential outage point. The monitoring and alerting module 150 can be operable to monitor the network and detect service conditions, and generate an alert. The monitoring and alerting module 150 can be coupled to a customer information database 155, for example a database that is associated with the address and billing information of a user. The monitoring and alerting module 150 can be implemented as one or more modules, comprising either software, hardware, or some combination thereof. The monitoring and alerting module 150 can be located at the headend 105, or at a location remote to the headend 105. At the headend, one or more modules of the monitoring and alerting module 150 can reside in a CMTS 105.

The monitoring and alerting module 150 can be operable to detect the sudden failure of a number of user devices 120a-d connected to a fiber node 130a-d or CMTS 110 port(s). This failure of several devices within a short timeframe can be classified as a potential HFC plant outage. The monitoring and alerting module can be operable to either poll user devices 120a-d or receive heartbeat signals from user devices 120a-d. The absence of a return signal when polled, or the absence of a heartbeat can be taken by the monitoring or alerting module 150 to be service condition fault or failure of the user device 120a-d.

In some implementations, a smaller number of failures can be used as a triggering threshold. Once a threshold is met and a potential outage is identified, the monitoring and alerting module 150 can use an identifier (such as a MAC address) associated with the user device 120a-d to determine the physical address of the premises in which the user device 120a-d resides. The monitoring and alerting module 150 can determine this, for example by querying one or more databases containing physical address information associated with the user device 120a-d. Physical address information can be contained in a customer service database, for example a customer service database for billing.

Once the street addresses for the failed devices have been identified, the addresses are compared to determine if the devices are close to each other. Street addresses of subscribers are more likely to be accurate since they are used for billing and repairs/installs. To make this determination, street addresses are broken down to a door number, street name, additional (non-numeric) qualifiers to the street number, dwelling identifiers (e.g. an apartment number/suite number, etc.). Addresses are considered adjacent if they have the same street name, and their numeric door numbers are numerically close to within a small number, such as 3 or 5 digits. The allowance of an increment in door numbers can allow for cases where the cable-plant is "back-fed"—i.e. when the plant runs between the back sides of two rows of houses on adjacent streets, and feeds houses facing both streets. For the street address number, digits in the ones place or tens place can be examined. In some neighborhoods, for example, houses are not number sequentially based on the digits in the ones place, but are numerically sequenced based on the digits in the tens place (e.g., house 500 and 510 are adjacent to each other). If a large number of failed CPE devices are physically adjacent to each other as determined from their addresses, that cluster can be declared to be an outage.

Figure 2:
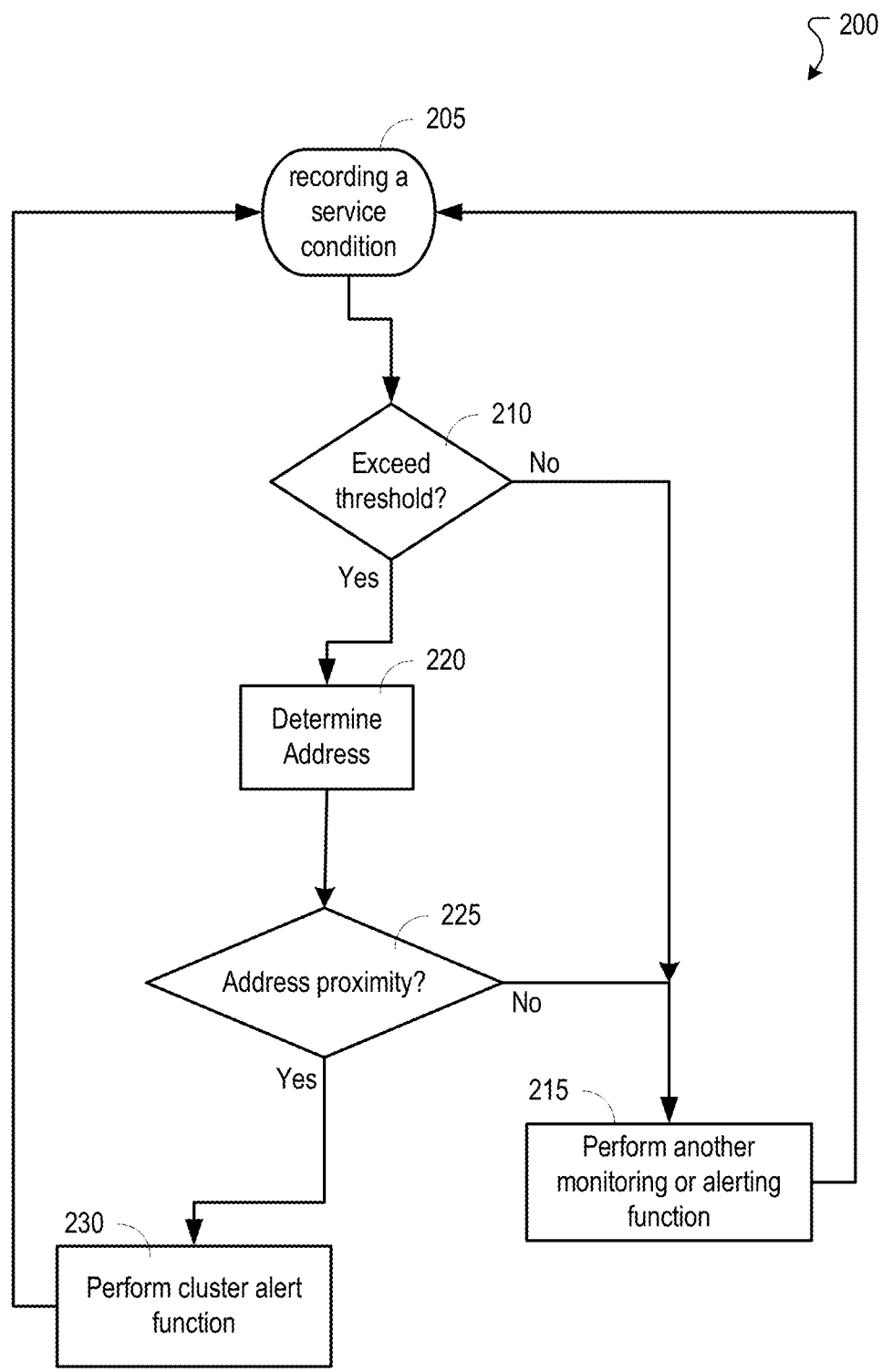
FIG. 2 is a flowchart illustrating an example of a method that can be performed by a service condition monitoring and alerting module using subscriber addresses.

FIG. 2 illustrates a flowchart illustrating an example process 200 for inferring a service condition for the HFC plant and generating a cluster alert. The example process can be performed by a module for monitoring and alerting (e.g., monitoring and alerting module of FIG. 1).

The process 200 can begin at stage 205, where a service condition is recorded. The service condition can be recorded by the monitoring and alerting module (e.g., monitoring and alerting module 150 of FIG. 1). The status of one or more user devices (e.g., user devices 120a-d of FIG. 1) can be detected to be that of a service condition (e.g., failure, outage, or offline condition). The service condition can be detected, for example, when a return signal is not received when a user device 120a-d is polled, or a heartbeat signal periodically transmitted by the user device 120a-d is not received. The service condition can be detected by the monitoring and alerting module. Once detected, the service condition for the user devices can be recorded.

At stage 210, a determination can be made as to whether the number of user devices for which a service condition exists exceeds a threshold number. The determination can be made by the monitoring and alerting module (e.g., monitoring and alerting module 150 of FIG. 1) using, for example, a counter.

At stage 215, if the threshold has not been exceeded, then the failures can be treated as individual device service conditions, in which case an appropriate alert can be generated (e.g., generated by the monitoring and alerting module 150 of FIG. 1). at stage 215 indicating that the individual user device(s) might be in need of service or in need of a home repair technician.

At stage 220, if the number of user devices having a service condition exceeds the threshold, the physical address of the user devices having the service conditions can be determined. The determination can be made by the monitoring and alerting module (e.g., monitoring and alerting module 150 of FIG. 1), which can match an identifier (e.g., the MAC address) associated with the user devices having service conditions with a user address associated with the user device. The user address can be stored in, for example, a customer information database (e.g., customer information database 155 of FIG. 1), which can typically be found in a customer billing information database.

At stage 225, a determination can be made as to whether the devices having the service conditions are in proximity to each other. The determination can be made by the monitoring and alerting module (e.g., monitoring and alerting module 150 of FIG. 1) by examining and analyzing the elements of a street address as described above.

If the user devices having service conditions are located at addresses that are not in close proximity to each other, then an alert can be sent indicating that the individual user device(s) 120*a-d* might be in need of a home service technician, as was described at stage 215. The alert can be sent by the monitoring and alerting module (e.g., monitoring and alerting module 150 of FIG. 1).

At stage 230, if the devices having service conditions are located at addresses that are in close proximity to each other (e.g., on the same street), then an alert can be generated that indicates that a cluster of devices in proximity to each other (for example having the same street address) are experiencing a service condition. The alert can be generated by the monitoring and alerting module (e.g., monitoring and alerting module 150), which can be operable to communicate via a variety of modalities. For example, the alert can be in the form of a report, or some other type of notification (e.g., e-mail, instant message, webpage, etc.). A person or persons receiving the alert, for example an HFC plant repairman, can then take appropriate action to determine the sub-node element that might be causing the service condition, repair or replace the element, and restore service to the user devices.

Figure 3:
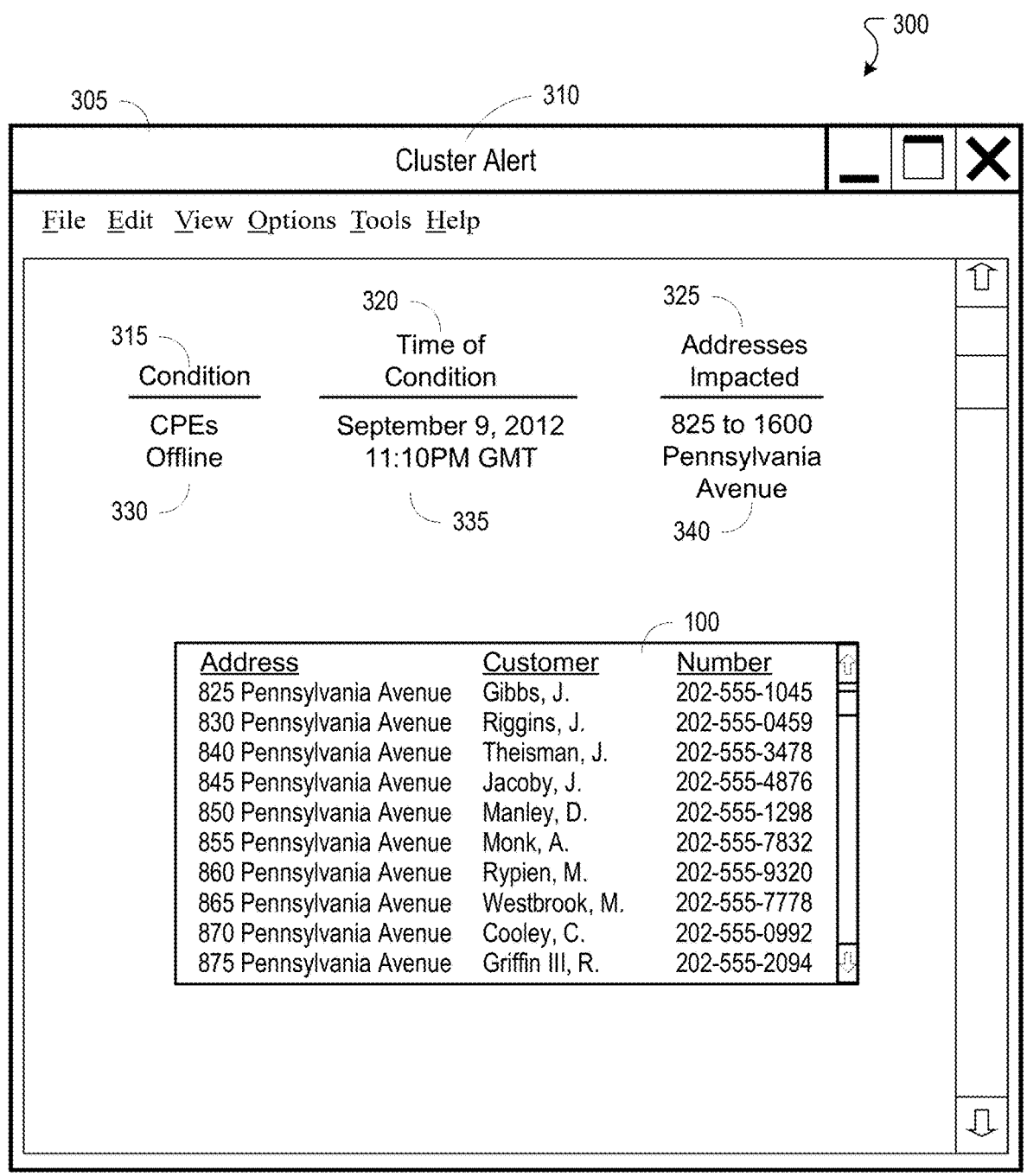
FIG. 3 is an example of a screen showing a notification of a service condition.

FIG. 3 describes an example implementation of a notification 300 that can be generated (e.g., generated at Stage 230 of FIG. 2). The notification 300 can be displayed in an electronic message (e.g., an e-mail or instant message). The notification 300 can also be a webpage (e.g., webpage 305 of FIG. 3), or some other computer generated screen or dialogue box operable to display information, including information comprising interactive elements. The webpage 305 can include typical features such as a scroll-bar, menu items, as well as buttons for minimizing, maximizing, and closing the webpage 305.

The webpage 305 of FIG. 3 can be accessed from a hyperlink. The hyperlink can be contained, for example, in an electronic message sent to service repairmen (e.g., an HFC plant repairman). The electronic message can originate from the monitoring and alerting module (e.g., monitoring and alerting module 150 of FIG. 1). The webpage 305 can have a title bar 310 displaying the nature of the alerts. In the implementation show in FIG. 3, the title bar 310 bears the title "Cluster Alert." However, other language can be used to indicate the nature of the alerts.

The webpage 305 can display several columns of information. The webpage 305 can include a column with headings Condition 315, Time of Condition 320, and Address Impacted 325. The information corresponding to the Condition 315 heading can include the service condition of user devices (e.g., user devices 120*a-d* of FIG. 1). For example, the displayed text CPEs Offline 330 under the Condition 315 heading indicates that the service condition of the user devices is offline. The information corresponding to the Time of Condition 320 heading can include the time that the service condition for the user devices occurred. For example, the text displaying time 335 indicates the time and date at which the user devices reached an offline service condition. If the time of the offline condition varies from device to device, a time range can be displayed, or alternatively, the time that the first user device experienced the offline condition can be displayed, or the time that the last user device went offline can be displayed. The information corresponding to the Address Impacted 325 heading can include a range of the locations (e.g., street address) of the user devices experiencing the service conditions. For example, the displayed text address range 340 indicates that the user devices that are offline all fall within the block of 825 to 1600 Pennsylvania Avenue.

A person (e.g., a service representative) viewing webpage 305 can interact with one or more elements of information displayed on the webpage 305. For example, if a service representative selects the address range 340 text, a dialogue box 100 can be displayed providing more detailed information regarding the addresses that correspond to the offline user devices. The more detailed information can include the street address, customer name, and contact information (e.g., a phone number) associated with the user devices experiencing the offline service condition. The dialogue box 100 can further be operable to display interactive information. For example, when the number of the customer is selected, a phone call can be placed to that number. Other elements of webpage 305 can be interactive as well. For example, when a service representative selects the text CPEs Offline 330, more detailed information about the offline condition can be displayed (e.g., "error code 25," or "CPEs not responding to polls"). The displayed information can allow a service representative to determine whether the cause of the service condition experienced by the user devices was due to a failure of the device or by a failure of a sub-node device.

Figure 4:
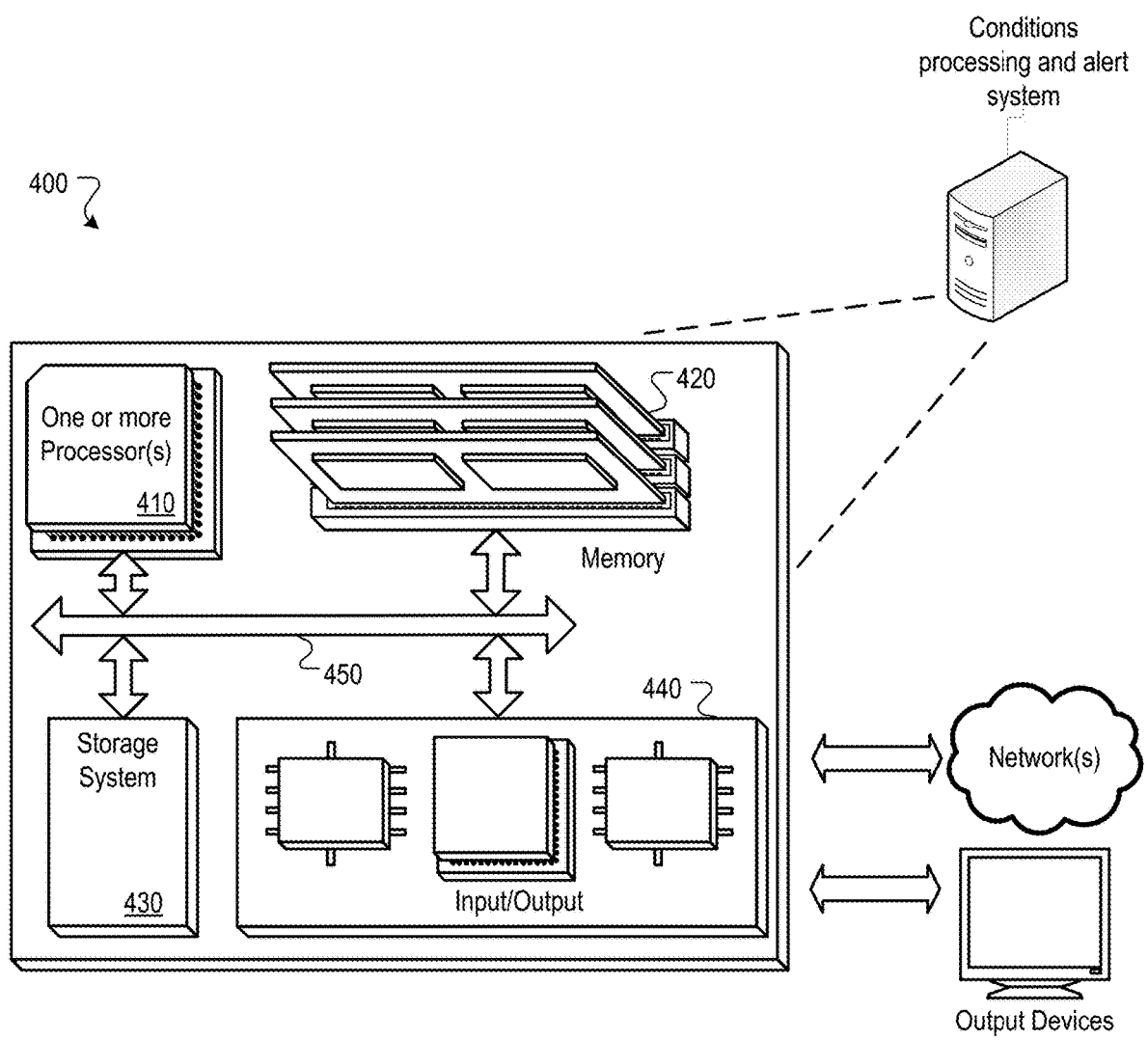
FIG. 4 is a block diagram illustrating an example of a system operable to provide service condition monitoring and alerting using subscriber addresses.

FIG. 4 is a block diagram illustrating a system operable to store and execute a monitoring and alerting module as described above. The system 400 can include a processor 410, a memory 420, a storage device 430, and an input/output device 440. Each of the components 410, 420, 430, and 440 can, for example, be interconnected using a system bus 450. The processor 410 is capable of processing instructions for execution within the system 300. In one implementation, the processor 410 is a single-threaded processor. In another implementation, the processor 410 is a multi-threaded processor. The processor 410 is capable of processing instructions stored in the memory 420 or on the storage device 430. For example, the monitoring and alerting module 150 can be processor 410 executing one or more computer program routines stored in memory 420 or on the storage device 430.

The memory 420 stores information within the device 400. In one implementation, the memory 420 is a computer-readable medium. In one implementation, the memory 420 is a volatile memory unit. In another implementation, the memory 420 is a non-volatile memory unit.

In some implementations, the storage device 430 is capable of providing mass storage for the device 400. In one implementation, the storage device 430 is a computer-readable medium. In various different implementations, the storage device 330 can, for example, include a hard disk device, an optical disk device, flash memory or some other large capacity storage device.

The input/output device 440 provides input/output operations for the device 400. In one implementation, the input/output device 440 can include one or more of a PSTN trunk interface (e.g., an RJ11 connector), an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices, as well as sending communications to, and receiving communications from various networks.

The converged call routing system (e.g., converged home location register) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

As mentioned above, in addition to a network that uses cable infrastructure, it should be understood that other networks, examples of which are described above, are contemplated to be within the scope of this disclosure. A DSL network operated by a telephone company, for example, can monitor for device failures between the DSLAM and a DSL modem at a user's premises.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operable coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube), LCD (liquid crystal display), LED (light emitting diode) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method for monitoring and alerting of a service condition within a hybrid fiber-coaxial (HFC) network, the method comprising:
   recording a service condition associated with a plurality of user devices connected to a sub-node portion of the HFC network, wherein:
      the sub-node portion is downstream from a fiber node,
      the sub-node portion comprises coaxial cable, a plurality of taps, and a plurality of amplifiers, and
      the sub-node portion extends from the fiber node to a plurality of user premises that comprise physical locations of the plurality of user devices;
   determining whether a threshold number of user devices have experienced the service condition within a period of time;
   determining whether physical locations of the user devices are within a threshold proximity to each other; and
   performing an alert action indicating the physical locations of the user devices experiencing the service conditions, the alert action comprising displaying textual information comprising a range of street addresses for the physical locations of the user devices experiencing the service conditions, wherein the textual information comprising the range of street addresses is interactively selectable;
   wherein determining whether the locations of the user devices are in proximity to each other comprises accessing a customer information database;
   wherein the customer information database contains information comprising addresses of the customers to which the one or more user devices are associated, the addresses comprising at least a number and street, and determining whether physical locations of the user devices are within a threshold proximity to each other comprises retrieving the addresses of the customers to which the user devices are associated and identifying that the addresses of the customers are within a threshold distance of each other; and
   wherein determining whether the locations of the user devices are in proximity to each other further comprises determining whether the street of the address is the same.

2. The method of claim 1, wherein the service condition comprises an offline state.

3. The method of claim 1, wherein the alert action varies depending on the proximity of the user devices to each other.

4. The method of claim 1, wherein the HFC network comprises one or more of a fiber optic node, fiber optic cable, coaxial cable, an amplifier, or a tap.

5. The method of claim 1,
   wherein determining whether the locations of the user devices are in proximity to each other further comprises determining the range of street addresses based on the numbers of the devices;
   the method further comprising, if the range of street addresses is interactively selected, displaying further information regarding one or more of the addresses of the customers to which the one or more user devices are associated.

6. A system for monitoring and alerting of a service condition within a hybrid fiber-coaxial (HFC) network, the system operable for:
   recording a service condition associated with one or more user devices connected to a sub-node portion of the HFC network, wherein:
      the sub-node portion is downstream from a fiber node,
      the sub-node portion comprises coaxial cable, a plurality of taps, and a plurality of amplifiers, and
      the sub-node portion extends from the fiber node to a plurality of user premises that comprise physical locations of the plurality of user devices;
   determining whether a threshold number of user devices have experienced the service condition within a period of time;
   determining whether physical locations of the user devices are within a threshold proximity to each other; and
   performing an alert action indicating the physical locations of the user devices experiencing the service condition, the alert action comprising displaying textual information comprising a range of street addresses for the physical locations of the user devices experiencing the service conditions;
   wherein the customer information database contains information comprising the addresses of the customers to which the one or more user devices are associated, the addresses comprising at least a number and street;
   wherein determining whether the locations of the user devices are in proximity to each other further comprises determining whether the street of the address is the same;
      wherein determining whether the locations of the user devices are in proximity to each other further comprises determining the range of street addresses based on the numbers of the devices, and
      wherein the textual information comprising the range of street addresses is interactively selectable;
      the method further comprising, if the range of street addresses is interactively selected, displaying further information regarding one or more of the addresses of the customers to which the one or more user devices are associated.

7. The system of claim 6, wherein the service condition comprises an offline state.

8. The system of claim 6, wherein the alert action varies depending on the proximity of the user devices to each other.

9. The system of claim 6, wherein the HFC network comprises one or more of a fiber optic node, fiber optic cable, coaxial cable, an amplifier, or a tap.

10. The system of claim 6, wherein determining whether the locations of the user devices are in proximity to each other comprises accessing a customer information database.

* * * * *